United States Patent
Jung et al.

(10) Patent No.: US 10,741,340 B2
(45) Date of Patent: Aug. 11, 2020

(54) SYMBOL BUTTON FOR VEHICLE AND MANUFACTURING METHOD THEREOF

(71) Applicants: HYUNDAI MOTOR COMPANY, Seoul (KR); KIA MOTORS CORPORATION, Seoul (KR); DAEYANG PLATECH INC., Siheung-si, Gyeonggi-do (KR)

(72) Inventors: Woo Chul Jung, Bucheon-Si (KR); Choon Soo Lee, Seoul (KR); Kyoung Sil Lee, Yongin-Si (KR); Jae Sik Seo, Hwaseong-Si (KR); Sung Ho Yoon, Suwon-si (KR); Yong Ju Gil, Siheung-si (KR); Won Gyoum Kim, Siheung-si (KR); Han Nam, Siheung-si (KR)

(73) Assignees: HYUNDAI MOTOR COMPANY, Seoul (KR); KIA MOTORS CORPORATION, Seoul (KR); DAEYANG PLATECH INC., Siheung-si, Gyeonggi-do (KR)

( * ) Notice: Subject to any disclaimer, the term of this patent is extended or adjusted under 35 U.S.C. 154(b) by 0 days.

(21) Appl. No.: 16/177,682

(22) Filed: Nov. 1, 2018

(65) Prior Publication Data
US 2019/0206635 A1    Jul. 4, 2019

(30) Foreign Application Priority Data
Dec. 29, 2017    (KR) .................. 10-2017-0184685

(51) Int. Cl.
*H01H 9/18*        (2006.01)
*B29C 45/00*       (2006.01)
(Continued)

(52) U.S. Cl.
CPC ......... *H01H 9/182* (2013.01); *B29C 45/0001* (2013.01); *B29C 45/0053* (2013.01);
(Continued)

(58) Field of Classification Search
CPC ........ B29C 45/16; C23C 18/32; H01H 9/182; C25D 5/56
(Continued)

(56) References Cited

U.S. PATENT DOCUMENTS

| 7,075,024 B2 * | 7/2006 | Maeda | H01H 25/041 |
| | | | 200/310 |
| 2001/0024703 A1 * | 9/2001 | Okamoto | H01H 13/14 |
| | | | 428/34.1 |

(Continued)

FOREIGN PATENT DOCUMENTS

| DE | 10200867 A1 | 7/2003 |
| DE | 102007001562 A1 | 7/2008 |
| WO | 2008/083873 A1 | 7/2008 |

*Primary Examiner* — Nguyen Tran
*Assistant Examiner* — Iman Malakooti
(74) *Attorney, Agent, or Firm* — Morgan, Lewis & Bockius LLP (57) ABSTRACT

A symbol button for a vehicle includes: a button body; a button surface portion positioned at an upper portion of the button body; a symbol printing portion positioned on the button surface portion; an anti-plating portion positioned at a lower portion of the button body; and a metal plating layer positioned at the outside of a button excluding the symbol printing portion and the anti-plating portion.

7 Claims, 7 Drawing Sheets

(51) Int. Cl.
| | |
|---|---|
| C23C 18/32 | (2006.01) |
| C23C 18/16 | (2006.01) |
| C25D 5/02 | (2006.01) |
| C25D 7/00 | (2006.01) |
| G05G 1/02 | (2006.01) |
| C25D 5/56 | (2006.01) |
| B29C 45/16 | (2006.01) |
| C25D 5/14 | (2006.01) |
| C23C 28/02 | (2006.01) |
| B29K 27/06 | (2006.01) |
| B29L 19/00 | (2006.01) |

(52) U.S. Cl.
CPC .......... *B29C 45/16* (2013.01); *C23C 18/1605* (2013.01); *C23C 18/1641* (2013.01); *C23C 18/1653* (2013.01); *C23C 18/32* (2013.01); *C25D 5/022* (2013.01); *C25D 5/14* (2013.01); *C25D 5/56* (2013.01); *C25D 7/00* (2013.01); *G05G 1/02* (2013.01); *B29C 2045/0079* (2013.01); *B29K 2027/06* (2013.01); *B29L 2019/00* (2013.01); *C23C 28/023* (2013.01); *H01H 2229/014* (2013.01)

(58) Field of Classification Search
USPC .................................................. 200/5 A, 310
See application file for complete search history.

(56) References Cited

U.S. PATENT DOCUMENTS

| | | | |
|---|---|---|---|
| 2003/0102204 A1* | 6/2003 | Shimizu ............... | H01H 13/702 200/341 |
| 2016/0152863 A1* | 6/2016 | Kostromine ............. | C09D 7/20 428/412 |
| 2017/0341609 A1* | 11/2017 | Frayer ................. | B29C 45/0053 |

* cited by examiner

FIG. 1

PC injection → ABS injection → Chemical plating /Electroplating

- PRIOR ART -

FIG. 2

- PRIOR ART -

| | ×<br>Non-plating occurrences due to printing spread | ○<br>Character distortion of printing portion | ◎ |
|---|---|---|---|
| Printing spread | Printing portion / Over 10 μm / Plating portion | Printing portion / Within 10 μm / Plating portion | Printing portion / Within 5 μm / Plating portion |

Surface photograph

Cross-section photograph (A-A')

FIG. 6

| | ×<br>(Printing is erased) | ○<br>(Printing is not erased) |
|---|---|---|
| Printing spread |  |  |

FIG. 7

SYMBOL BUTTON FOR VEHICLE AND MANUFACTURING METHOD THEREOF

CROSS-REFERENCE TO RELATED APPLICATION

This application claims priority to and the benefit of Korean Patent Application No. 10-2017-0184685 filed in the Korean Intellectual Property Office on Dec. 29, 2017, the entire contents of which are incorporated herein by reference.

TECHNICAL FIELD

The present disclosure relates to a symbol button for a vehicle, and a manufacturing method thereof.

BACKGROUND

A vehicle has various switch buttons therein so as to operate various functions of the vehicle. Such switch buttons have a typical function for operating or manipulating vehicle parts such as an audio system, an air conditioner, and a window, and have an aesthetic function for visually checking the parts and for feeling the parts with tactile sense when touching them.

For the vehicular switch buttons, in general, metallic aluminum, metallic paint, matte coating, ion plating, and in-mold film for decoration are used.

The ion plating and the metallic paint are used for providing metallic texture to switch buttons, but since there is a difference between feeling when seeing them with the naked eye and feeling when touching them, there is a detriment in terms of marketability.

Therefore, a method of plating a metal on a button surface of a polymer material has been proposed.

Currently, there are two typical methods of plating the metal.

Figure 1:
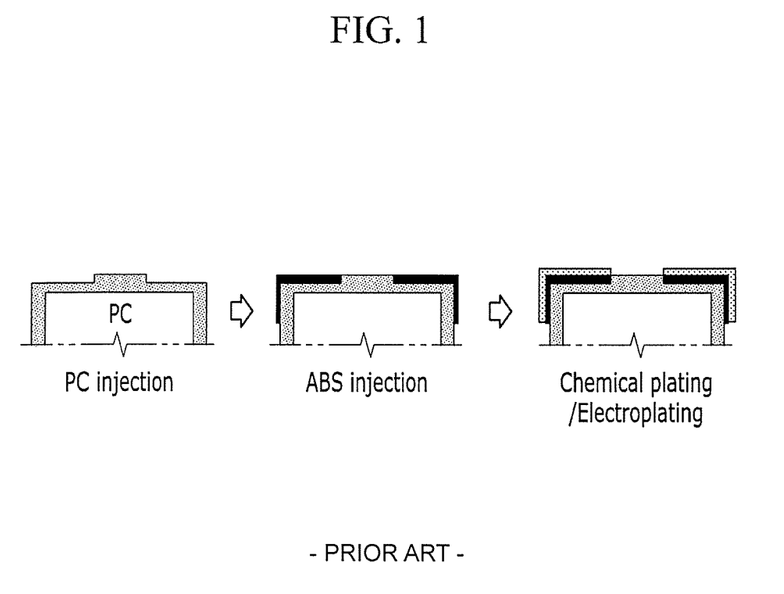
FIG. 1 illustrates a schematic diagram of a conventional multiple injection partial plating method.

A first method is a multiple injection partial plating method. FIG. 1 is a schematic view of the multiple injection partial plating method.

In this method, different materials are injected into and bonded to a plating area and a non-plating area for the partial plating. A polycarbonate material is firstly injected so that a shape of a desired symbol (character or pattern) is formed for the formation of the non-plating area, and a metal-plateable ABS or PC+ABS material is injected onto a surface thereof.

In this case, molten ABS or PC+ABS is bonded to a PC material. Thereafter, when wet chrome plating (chemical plating+electroplating) is performed, a plating layer is formed only on an ABS or PC+ABS surface, and the PC material becomes a non-plating area.

According to this method, since a new mold is required every time the symbol is changed, a mold investment increases, and plating failure occurs when injection failure occurs due to insufficient flowability during injection molding.

Figure 2:
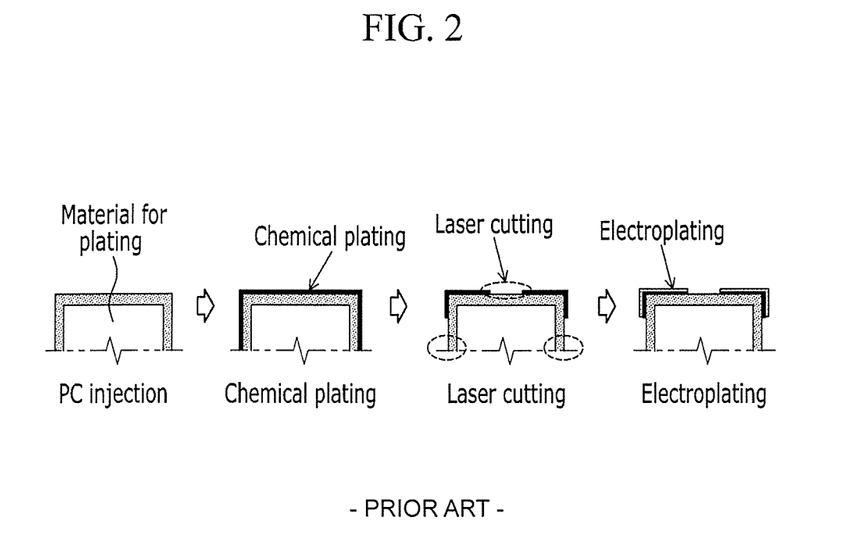
FIG. 2 illustrates a schematic diagram of a conventional laser cutting partial plating method.

A second method is a laser cutting partial plating method. FIG. 2 is a schematic diagram of a laser cutting partial plating method.

A plastic plating process includes a sequential process in which conductivity is imparted to a non-conductive injection material by chemical plating and then a metal layer is formed by electroplating, and this equally applies to the above-described plastic plating.

The laser cutting partial plating method is a method of forming a symbol, a pattern, etc. on a product surface by partially removing a chemical plating layer by using laser cutting after chemical plating and then performing electroplating.

However, the conventional laser cutting partial plating including the sequential process, there are problems such as forming a plating layer in the process of taking out a product from a plating jig after the chemical plating, laser-cutting the product, and then mounting it again on the plating jig to perform the electroplating thereon.

Thus, a metal plating method that may more effectively form symbols on plastics is required.

The above information disclosed in this Background section is only for enhancement of understanding of the background of the invention and therefore it may contain information that does not form the prior art that is already known in this country to a person of ordinary skill in the art.

SUMMARY

The present disclosure has been made in an effort to provide a symbol button of a vehicle and a manufacturing method thereof that may provide a metallic cool touch feeling and improve merchantability thereof by applying a wet chrome plating surface treatment to buttons that a driver frequently touches with his hand.

In addition, the present disclosure has been made in an effort to provide a symbol button of a vehicle and a manufacturing method thereof that may form a character/symbol for imparting daytime visibility to a surface of a switch button, and may provide lighting to the character/symbol for night visibility.

An exemplary embodiment of the present disclosure provides a symbol button for a vehicle, including: a button body; a button surface portion positioned at an upper portion of the button body; a symbol printing portion positioned on the button surface portion; an anti-plating portion positioned at a lower portion of the button body; and a metal plating layer positioned at the outside of a button excluding the symbol printing portion and the anti-plating portion.

The symbol printing portion may be a material through which light is transmitted.

The anti-plating portion may be printed with the same material as the symbol printing portion.

An anti-plating film may be attached to the anti-plating portion.

The button body and the button surface portion may be the same material formed by a single injection.

The button body and the button surface portion may be polymeric materials capable of metal plating.

The symbol printing portion and the anti-plating portion may be polymer materials on which a metal is not plated.

The symbol printing portion may be manufactured using a polymer composition containing a polyvinyl chloride (PVC) resin, a solvent, and an antistatic agent, and based on 100 wt % of the polymer composition, a content of the solvent may be in a range of 3 to 7 wt %.

Another embodiment of the present disclosure provides a manufacturing method of a symbol button for a vehicle, including: manufacturing a button through single injection with a polymer material on which a metal is plated; printing a symbol on a surface portion of the button with a polymer material on which a metal is not plated; forming an anti-plating portion at a lower portion of a body portion of the button; and forming a metal plating layer outside the button.

The forming of the anti-plating portion at the lower portion of the body portion of the button may include printing a polymer material on which the metal is not plated on the lower portion of the body portion.

The forming of the anti-plating portion at the lower portion of the body portion of the button may include forming a metal plating preventing tape on the lower portion of the body portion.

The polymer material on which the metal is not plated may be manufactured using a polymer composition containing a PVC resin, a solvent, and an antistatic agent, and based on 100 wt % of the polymer composition, a content of the solvent may be in a range of 3 to 7 wt %.

According to the embodiments of the present disclosure, an additional mold is unnecessary when various characters/symbols are applied at the same position for changing a character/symbol unlike the conventional double injection partial plating, and it is possible to simplify a process compared to the partial plating using laser cutting after chemical plating.

DETAILED DESCRIPTION OF THE EMBODIMENTS

Hereinafter, exemplary embodiments of the present disclosure will be described in detail. The exemplary embodiments, however, are provided as examples, and the present disclosure is not limited thereto, but is defined within the range of claims to be described below.

An exemplary embodiment of the present disclosure relates to a process of preventing a plating layer from being formed on a character/symbol portion by performing a wet chrome plating process after printing ink on which a plating layer is not formed on a product surface for partially plating a conventional switch button.

In this case, the ink on which the plating layer is not formed should have characteristics in which light may be transmitted for illumination, and in which it is not eroded or exfoliated by plating chemicals during the plating process.

First, the button is realized by a single injection method using a polymer material capable of metal plating. Subsequently, a shielding printing layer for preventing the plating layer from being formed on the injected material is formed. Then, when the printed injection part is subjected to the wet chrome plating process, a plating layer is formed only on an unprinted area of a transparent or semi-transparent injection material, and no plating layer is formed on a printing portion and an opaque material area.

In this case, a characters/symbol is formed in the printing portion in which no plating layer is formed, so that a driver may recognize the character/symbol with his naked eye. In addition, lighting is provided through the printing portion in the nighttime, so that the character/symbol may be recognized at night.

Specifically, in the exemplary embodiment of the present disclosure, a plastic injection process, a symbol (character/symbol) printing process, a lower surface shielding layer forming process, and a wet plating process are sequentially performed. FIGS. 3A-3E illustrate a flowchart of a manufacturing method of a button according to an exemplary embodiment of the present disclosure.

In this case, an injection material for end portion plating is used in the plastic injection process. A transparent material for plating may be acrylonitrile butadiene styrene (ABS), polycarbonate (PC)+ABS, PC, etc. having plating properties and light transmittance.

Thereafter, the printing process for preventing plating may be performed.

Polyvinyl chloride (PVC) resin-based ink may be used in the printing process for preventing plating, and the printing process for preventing plating may be performed by pad printing, screen printing, laser printing, and the like.

The ink may include a PVC resin having a molecular weight of 15,000 to 25,000 Mw. The PVC resin has excellent chemical resistance against sulfuric acid/chromic acid/hydrochloric acid during the plating process, and has a characteristic of preventing plating of metal.

After the printing process, the ink may be cured by drying at a temperature of 60 to 80° C. for 0.5 to 2.0 hours.

Then, a plating shielding layer on a lower surface of the button may be formed.

The plating shielding layer on the lower surface of the button serves to prevent the formation of the plating layer by preventing electricity from flowing to a rear surface of the product. When the button is injected using a plating material and is subject to a plating process, a metal layer is formed on the rear surface of the material, thus light is not transmitted.

Accordingly, a plating shielding layer may be formed at the lower portion of the button for preventing a plating layer from being formed on the rear surface of the injected material.

The plating shielding layer serves to prevent electrical conduction between the button and a lighting structure, such as a polychlorinated biphenyl (PCB) button and a light-emitting diode (LED), thereby preventing product damage and malfunction when an external electrical impact is applied thereto. In addition, it is possible to prevent light from being leaked in a side thereof when button illumination is applied thereto.

Figure 3A:
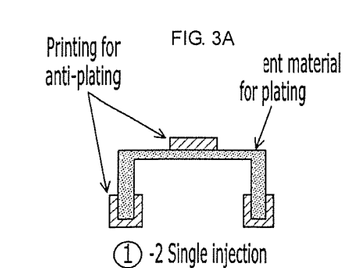
FIGS. 3A-3E illustrate a manufacturing method of a button according to an exemplary embodiment of the present disclosure.

FIG. 3A illustrates a method of forming a plating shielding layer by dipping an ink printed to a symbol and using pad printing or the like.

When the printing process is applied, the plating process is performed after a drying process at 80° C. for 30 min.

Figure 3B:
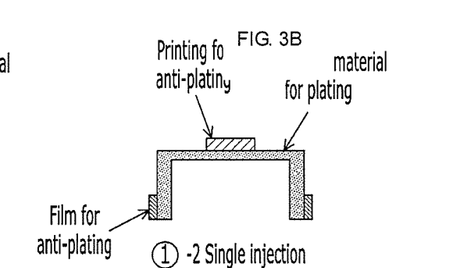

FIG. 3B illustrates a method in which a film that does not react with plating chemicals is attached to a lateral surface of the product and then a plating process is performed.

The film may be a PVC fil\m, a thermoplastic polyurethane (TPU) film, polypropylene (PP) film.

The film is required to have characteristics in which there is no deformation and stretching and no decrease in adhesion force at a plating process condition of 80° C. or less.

For example, the film may be made of 3M Automotive Grade high adhesion Scotchcal™, which is a PVC material.

Figure 3C:
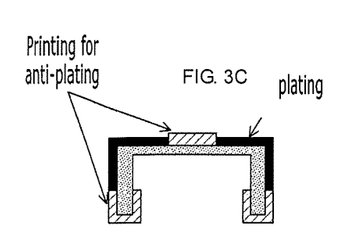
Figure 3D:
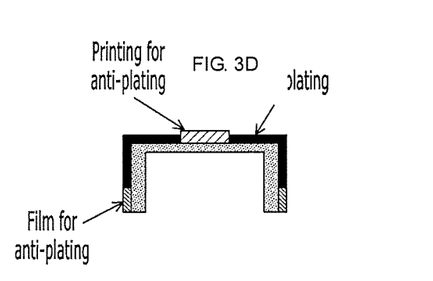
Figure 3E:
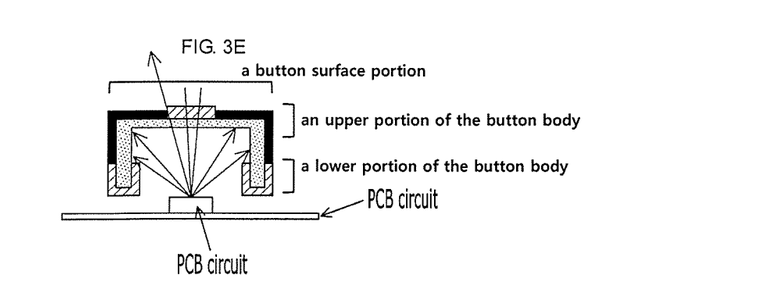

Then, a wet chrome plating process may be performed, as shown in FIGS. 3C-3E.

The wet chrome plating process is mainly divided into etching, chemical plating, and electroplating processes.

The etching process (pretreatment process) serves to dissolve a butadiene component of the ABS and PC+ABS surfaces by using chromic acid/sulfuric acid and to form an anchor hole therein, thereby imparting plating adhesion.

The chemical plating process is a process of forming a thin chemical nickel plating layer of for example, 1 μm, thereon so that a surface of a non-conductive plastic injection material has conductivity.

The electroplating process is a process for sequentially forming a copper, nickel, and chrome layer thereon by applying electricity to the surface of the product.

In the case of the printing layer for preventing plating, the PVC material is not dissolved in the chromic acid/sulfuric acid, thus a chemical nickel plating layer is not formed, so that a plating layer is not formed in the electroplating process.

Hereafter, an exemplary embodiment of the present disclosure and a comparative example will be described. However, the following exemplary embodiments are for exemplary purposes only, and the scope of the present disclosure is not limited thereto.

Exemplary Embodiments

Selection of Infection Material for Plating

A condition required for a transparent injection material for plating is to be able to have plating adhesion force and lighting.

ABS, PC+ABS, and PC materials are available. In a product, a thickness thereof is 1.0 to 1.5 mm.

When the thickness of the material is 1.0 mm or less, flowability of the material is insufficient, thus moldability upon injection is deteriorated. When the thickness of the material is 2.0 mm or more, total light transmittance is 5 or less and HAZE is 95 or more, so that the light transmittance is decreased, and thus it is difficult to apply to a lighting part.

Selection of Ink Resin

In order to realize printing for preventing a plating layer from being formed on a character/symbol portion, PVC, poly(methyl methacrylate) (PMMA), and polyurethane (PU) resins applicable to a plastic material were evaluated.

The PMMA or PU resin was dissolved in chemicals such as sulfuric acid, hydrochloric acid, and chromic acid in the plating process, thus the printing layer was removed or the plating layer was formed on the surface thereof even if the printing layer remained. In the case of the PVC resin, since the chemical resistance thereof was strong, the printing layer was not removed even after the chrome plating process, thus the plating layer was not formed.

In the case of the PVC resin, regardless of the molecular weight thereof, no plating layer was formed after the wet chrome plating. The molecular weight of the PVC resin may be 20,000 to 30,000 Mw.

When the molecular weight of the PVC resin is less than 20,000 Mw, printing capability is deteriorated due to printing spread, and it is difficult to secure a printed thickness after printing.

When the molecular weight of the PVC resin is more than 30,000 Mw, the slip property of the resin is degraded such that the ink surface after the printing becomes rough, and the sharpness of the image is degraded due to printing spread such that a repeated printing is difficult. Further, the uniformity of the plating is degraded such that the character/symbol is not constant.

In the printing, it is possible to form characters and symbols by pad printing, screen printing, and laser printing methods.

An organic solvent is used to ensure the printability of the PVC resin. The organic solvent serves to adjust viscosity and to disperse the resin. In this case, the organic solvent may be acetonitrile, isophorone, or xylene. The content of the organic solvent may be about 3 to 7 wt % with respect to the resin.

When the content of the solvent is less than 3 wt %, the viscosity of the ink solution is as high as 5000 cP, so that the dispersibility is degraded. In addition, when the viscosity thereof is high, the ink is not transferred to an injection product during the pad printing, but remains on a pad (silicone rubber), so that the printability is degraded.

When the content of the solvent is more than 7 wt %, the viscosity of the ink solution is as low as 2000 cP or less, so that the printing spread becomes serious, and it becomes difficult to secure a thickness of a coating film after printing and drying.

A curing agent is used for increasing durability properties such as chemical resistance, heat resistance, and adhesion force through curing with the PVC resin. The curing agent may include an isocyanate-based curing agent, include HDI, MDI, TDI, or IPDI and may be applied with the content of 20 parts by weight.

When the content of the curing agent is less than 10 parts by weight, the chemical resistance is degraded due to insufficient curing of the coating film, and when the content of the curing agent is more than 20 parts by weight, the durability properties are improved, but the printability is degraded, and the pot life of the ink is shortened due to exposure to air. In addition, due to excessive curing with the resin, cracking of the coating film occurs after evaluation of light resistance.

Figure 4:
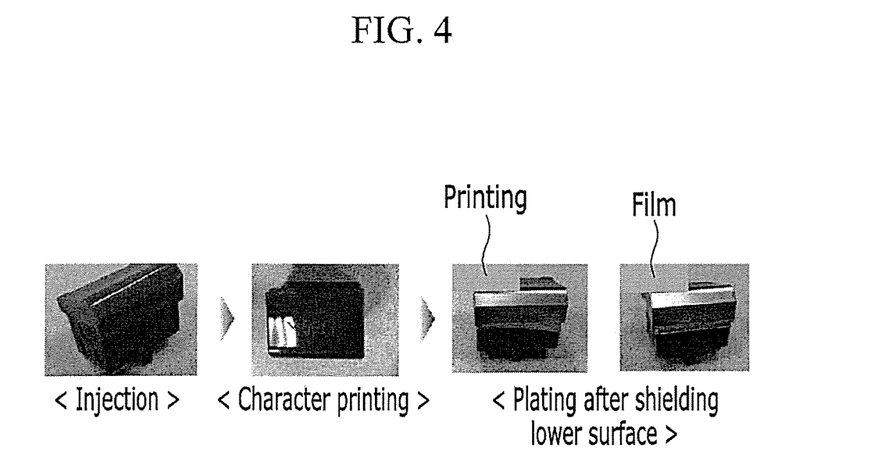
FIG. 4 illustrates photographs of respective manufacturing processes of a button according to an exemplary embodiment of the present disclosure.

FIG. 4 illustrates photographs of respective manufacturing processes of a button according to an exemplary embodiment of the present disclosure.

TABLE 1

| Resin type | #1 PVC-1 (Molecular weight: 10,000) | #2 PVC (Molecular weight: 20,000) | #3 PVC (Molecular weight: 30,000) | #3 PVC (Molecular weight: 40,000) | #4 PMMA (Molecular weight: 10,000 or less) | #5 PU (Acryl urethane) |
|---|---|---|---|---|---|---|
| Printability | Δ | ◎ | ◎ | Δ | ◎ | ◎ |
| Non-plating performance | ◎ | ◎ | ◎ | ◎ | X | X |
| Light transmittance | ◎ | ◎ | ◎ | ◎ | ◎ | ◎ |

TABLE 2

|  | #6 PVC (Molecular weight: 20,000) | #7 PVC (Molecular weight: 20,000) | #8 PVC (Molecular weight: 20,000) | #9 PVC (Molecular weight: 20,000) | #10 PVC (Molecular weight: 20,000) | #11 PVC (Molecular weight: 20,000) | #12 PVC (Molecular weight: 20,000) | #13 PVC (Molecular weight: 20,000) |
|---|---|---|---|---|---|---|---|---|
| Resin type |  |  |  |  |  |  |  |  |
| Resin | 30 | 50 | 70 | 90 | 90 | 90 | 90 | 90 |
| Solvent | 70 | 47 | 30 | 7 | 7 | 7 | 3 | 10 |
| Antistatic agent |  | 3 |  | 3 | 3 | 3 | 7 |  |
| Total | 100 wt % | 100 wt % | 100 wt % | 100 wt % | 100 wt % | 100 wt % | 100 wt % | 100 wt % |
| Curing agent |  | 10 parts by weight |  | 20 parts by weight | 10 parts by weight | 30 parts by weight | 20 parts by weight | 20 parts by weight |
| Printing failure | ○ (printing spreading) | ◎ | ○ (printing spreading) | ◎ | ◎ | ○ (unprinted, short using time) | ◎ (unprinted, viscosity increase) | ○ (printing spreading) |
| Chemical resistance (ethanol/gasoline) | X | ○ | X | ◎ | ○ | ◎ | ◎ | ◎ |

Figure 5:
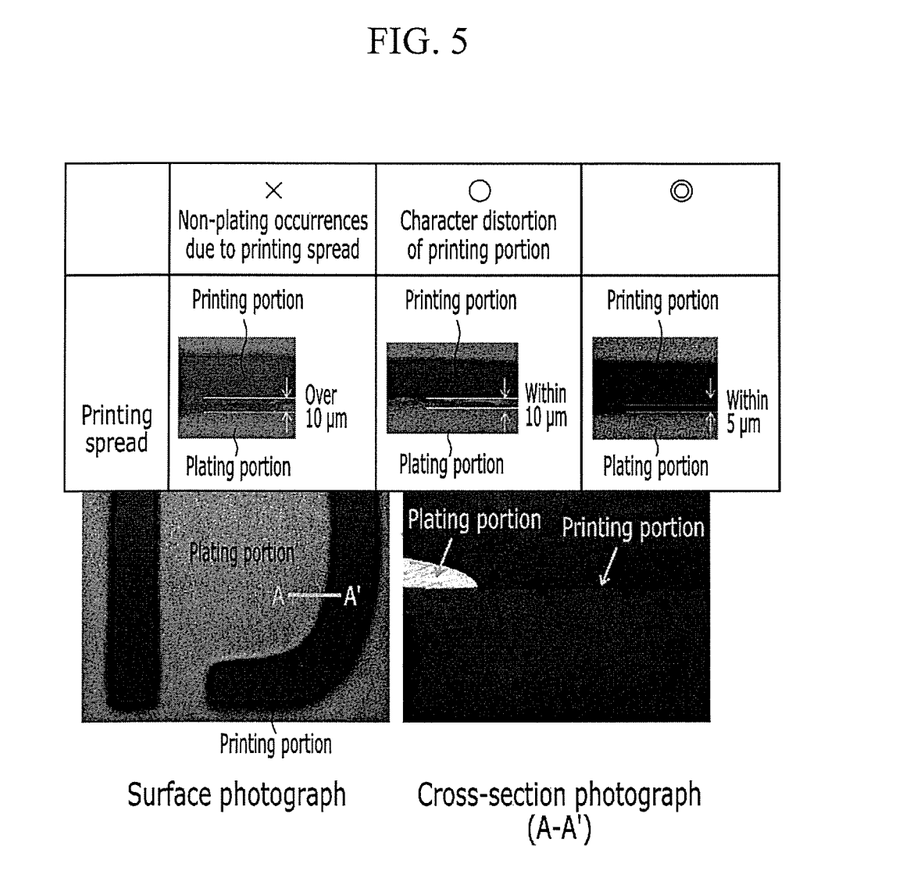
FIG. 5 illustrates criteria for determining printing failure.
Figure 6:
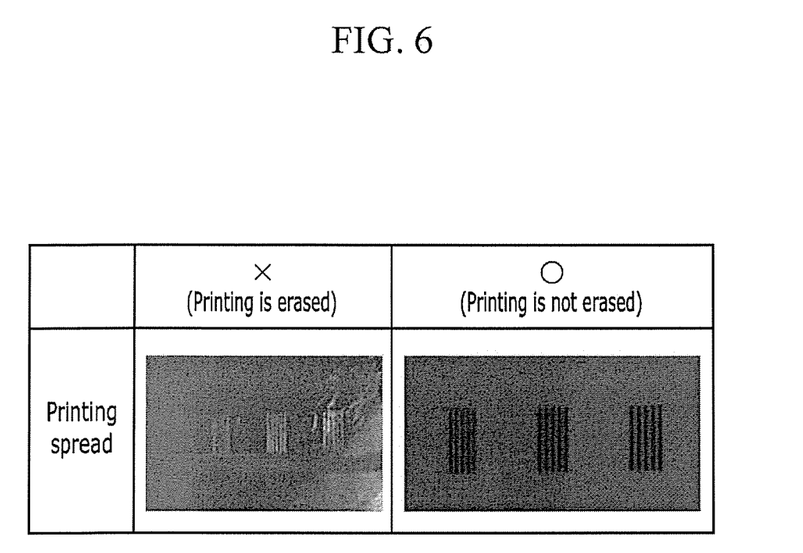
FIG. 6 illustrates criteria for determining chemical resistance.

FIG. 5 illustrates criteria for determining printing failure. FIG. 6 illustrates criteria for determining chemical resistance.

Selection of Shielding Ink

As performance required for a shielding tape, a chemical plating layer should not be formed in the shielding tape during the plating process, and the shielding tape should have an insulating property during the electroplating process, and should not react with chemicals during the plating process.

The PVC tape was the Scotchcal™ high performance automotive grade of 3M company.

Figure 7:
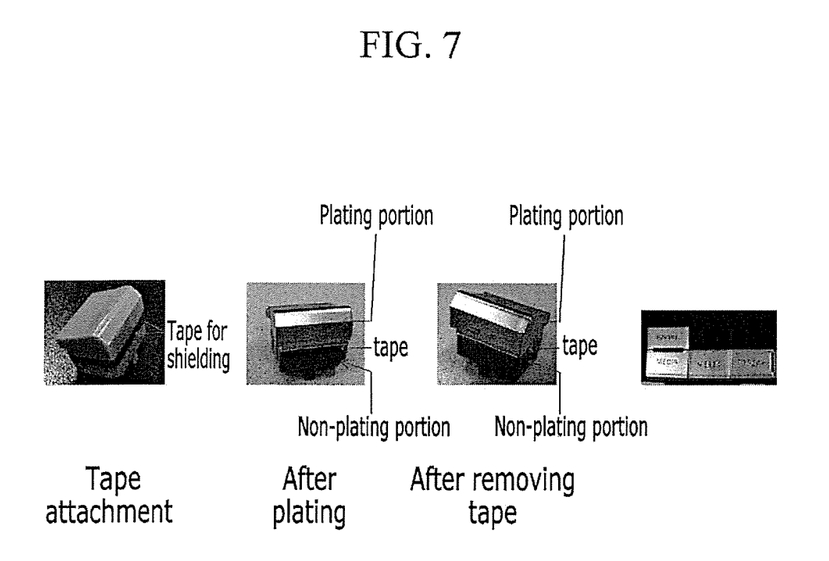
FIG. 7 illustrates photographs of buttons manufactured using a plating shielding tape.

FIG. 7 illustrates photographs of buttons manufactured using a plating shielding tape.

TABLE 3

|  | PE film | PVC film | PET film |
|---|---|---|---|
| Shielding performance | Dissatisfaction Plating chemicals are melted during a plating process. | No abnormality | Dissatisfaction During a plating process, chemicals penetrate between injection products due to shrinkage occurrence. |

According to the method of the present disclosure, which is a method for replacing the double injection partial plating applied to conventional buttons, by forming characters and symbols on buttons through a partial plating method without double injection, it is possible to provide a metal appearance and a cool touch feeling to a consumer.

According to the present disclosure, by forming a printing layer capable of preventing plating and light transmission on a surface of a plating material capable of transmitting light through a pad or a screen printing method and by performing a wet chrome plating process, it is possible to form a metal layer only in the remaining area except for a character/symbol printing layer, and to transmit light only in a character/symbol area, thereby providing a character/symbol image in the daytime and an illuminated image in the nighttime.

According to the embodiment of the present disclosure, compared to the conventional double injection partial plating, it is possible to provide a relatively simple structure, and it is possible to change a character/symbol by changing a printing pattern without an additional mold when the character/symbol is changed. In addition, for cost reduction, it is possible to change double injection for forming a non-plating area to single injection.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A symbol button for a vehicle, comprising:
   a button body;
   a button surface portion positioned at an upper portion of the button body;
   a symbol printing portion positioned on the button surface portion;
   an anti-plating portion positioned at a lower portion of the button body; and
   a metal plating layer positioned at an outside of a button excluding the symbol printing portion and the anti-plating portion,
   wherein the symbol printing portion includes a polymer composition containing a polyvinyl chloride (PVC) resin, a solvent, and an antistatic agent, and
   based on 100 wt % of the polymer composition, a content of the solvent is in a range from 3 to 7 wt %.
2. The symbol button for the vehicle of claim 1, wherein the symbol printing portion includes a material through which light is transmitted.
3. The symbol button for the vehicle of claim 1, wherein the anti-plating portion is printed with the same material as the symbol printing portion.
4. The symbol button for the vehicle of claim 1, wherein an anti-plating film is attached to the anti-plating portion.
5. The symbol button for the vehicle of claim 1, wherein the button body and the button surface portion have the same material.

6. The symbol button for the vehicle of claim 5, wherein the button body and the button surface portion are polymeric materials.

7. The symbol button for the vehicle of claim 1, wherein the symbol printing portion and the anti-plating portion are polymer materials on which a metal is not plated.

* * * * *